United States Patent
Clifford (10) Patent No.: US 8,572,758 B1
(45) Date of Patent: Oct. 29, 2013

(54) DLP-ENFORCED LOSS SCANNING, SEQUESTERING, AND CONTENT INDEXING

(75) Inventor: Thomas G. Clifford, Edina, MN (US)

(73) Assignee: Symantec Corporation, Mountain View, CA (US)

( * ) Notice: Subject to any disclaimer, the term of this patent is extended or adjusted under 35 U.S.C. 154(b) by 936 days.

(21) Appl. No.: 12/413,801

(22) Filed: Mar. 30, 2009

(51) Int. Cl.
G06F 12/14 (2006.01)

(52) U.S. Cl.
USPC ............................................ 726/30; 707/741

(58) Field of Classification Search
None
See application file for complete search history.

(56) References Cited

U.S. PATENT DOCUMENTS

| | | | |
|---|---|---|---|
| 5,813,008 A | 9/1998 | Benson et al. | |
| 5,990,810 A | 11/1999 | Williams | |
| 6,983,365 B1 | 1/2006 | Douceur | |
| 7,185,238 B2 | 2/2007 | Wedel et al. | |
| 7,249,264 B2 * | 7/2007 | Belknap et al. | 713/189 |
| 7,266,689 B2 | 9/2007 | Douceur | |
| 7,320,008 B1 * | 1/2008 | Colgrove | 1/1 |
| 7,356,701 B2 | 4/2008 | Margolus | |
| 7,590,866 B2 * | 9/2009 | Hurtado et al. | 713/189 |
| 7,783,604 B1 | 8/2010 | Yueh | |
| 7,822,939 B1 | 10/2010 | Veprinsky et al. | |
| 7,849,065 B2 | 12/2010 | Kamani | |
| 7,908,436 B1 | 3/2011 | Srinivasan et al. | |
| 7,913,309 B2 | 3/2011 | Starostin | |
| 8,041,074 B2 | 10/2011 | Rhoads | |
| 8,055,618 B2 | 11/2011 | Anglin | |
| 8,121,198 B2 | 2/2012 | Thambiratnam | |
| 8,141,129 B2 | 3/2012 | Ray | |
| 8,156,092 B2 | 4/2012 | Hewett | |
| 2007/0014360 A1 | 1/2007 | Botzko | |
| 2008/0172430 A1 | 7/2008 | Thorstensen | |
| 2008/0243879 A1 | 10/2008 | Gokhale et al. | |
| 2009/0063528 A1 | 3/2009 | Yueh | |
| 2009/0268903 A1 | 10/2009 | Bojinov et al. | |
| 2009/0271402 A1 | 10/2009 | Srinivasan et al. | |
| 2009/0319772 A1 | 12/2009 | Singh et al. | |
| 2009/0327625 A1 | 12/2009 | Jaquette et al. | |
| 2009/0328134 A1 | 12/2009 | Ray et al. | |
| 2010/0198797 A1 | 8/2010 | Wideman | |

OTHER PUBLICATIONS

"The Challenges of Deploying Information Rights Management Across the Enterprise," EMC Corp., 2008, 9 pages.
"Secure Data Deduplication," Storer et al., Oct. 31, 2008, 10 pages.
"Technical Overview of Microsoft Windows Rights Management (RM) in the Enterprise," Microsoft Corp., Feb. 2003, 29 pages.

(Continued)

*Primary Examiner* — Gary Portka
(74) *Attorney, Agent, or Firm* — Meyertons, Hood, Kivlin, Kowert & Goetzel, P.C.

(57) ABSTRACT

A system and method is disclosed for implementing a data loss prevention (DLP) system configured to protect sensitive data in conjunction with corresponding content indexing (CI) metadata. In response to detecting a data loss risk, such as to data at rest (e.g., stored on a file system) and/or to data in motion (e.g., data being transmitted across a network) the system may perform any number of data loss prevention actions, including sequestering the data. The system may utilize an interface to a content indexing system in order to discover CI metadata associated with the data and sequester the CI metadata associated with the data. One or more common sequestration rules may be applied to the sequestration of the data and of the metadata. For example, the data and metadata may be encrypted using the same key and/or sequestered in the same location.

14 Claims, 5 Drawing Sheets

(56) References Cited

OTHER PUBLICATIONS

"Data Loss Prevention," Prathaben Kanagasingham, Aug. 15, 2008, 38 pages.
U.S. Appl. No. 12/240,405, filed Sep. 29, 2008.
U.S. Appl. No. 12/415,577, filed Mar. 31, 2009.
U.S. Appl. No. 12/058,833, filed Mar. 31, 2008.
U.S. Appl. No. 12/415,699, filed Mar. 31, 2009.
U.S. Appl. No. 12/413,821, filed Mar. 3, 2009.
Johnson, M., Ishwar, P., Prabhakaran, V., Schonberg, D. and Ramchandran, K., "On Compressing Encrypted Data," IEEE Transactions on Signal Processing, vol. 52, No. 10, Oct. 2004, pp. 2992-3006.

* cited by examiner

DLP-ENFORCED LOSS SCANNING, SEQUESTERING, AND CONTENT INDEXING

BACKGROUND OF THE INVENTION

1. Field of the Invention

This invention relates to the operation of data loss prevention systems and more specifically, to the protection of content indexing metadata using data loss prevention systems.

2. Description of the Related Art

A content indexing (CI) system may enable indexing, discovery, and/or search of data on a computer system or network. For example, a CI application may perform a background scan of one or more file systems, during which the CI system scans the contents of various files in the file system(s). After scanning the contents of a given file, the CI application may generate metadata describing the contents of the file and associate the metadata with the file. For example, the CI application may record the association in an indexing database. The particular format of the CI metadata itself may vary depending on the particular CI system implementation.

The content indexing database may be used to enable quick searches of the file system content. In order to perform the search, a search engine may consult the indexing database rather than perform the relatively time consuming and computationally expensive task of content scanning various files in the file system.

In various systems and networks, the files scanned by a CI system may contain sensitive information, such as personal and/or proprietary information. Such data may be considered sensitive from a business and/or legal standpoint. For example, some computer files may contain proprietary information that the organization does not wish to be leaked to outside parties. In other examples, various legal constraints may require that an organization track personal information on its network, such as credit card numbers and/or social security numbers. An organization may be legally required to abide by various data privacy and/or breach notification laws that require the organization to notify customers or other stakeholders when their information may have been exposed.

In order to identify, monitor, and protect sensitive data, an organization may employ a Data Loss Prevention (DLP) system. Such systems may also be known as Data Leak Prevention, Information Leak Detection and Prevention, Information Leak Prevention, Content Monitoring and Filtering, Extrusion Prevention System, among other names.

To identify a data loss risk, a DLP system may need to determine whether a given file contains sensitive data. For example, to protect data "at rest" (e.g., stored in a file system) a DLP system may scan the contents of each file in a file system, for example, by using a background scan of the files, such as is commonly done with virus scanning or content indexing. For example, a background scan may be scheduled to scan all the files in a file system for sensitive data every evening at a predetermined time, or at any other interval. A DLP system may protect data in motion (e.g., being transmitted via a network) by scanning files before they are transferred. For example, in response to detecting that a given user is attempting to email a file to an outside party, the DLP system may scan the contents of the file to determine if it contains sensitive information.

If the contents of a given file are deemed sensitive, often according to a set of configurable heuristics, the DLP system may determine that a data loss risk exists and perform any number of protective DLP actions according to one or more data loss prevention rules. For example, if during a background scan, a DLP system detects that a given file at rest contains sensitive data (e.g., social security numbers, credit card numbers, etc.), the DLP system may sequester the file according to various sequestration rules. Under various sequestration rules, sequestering the file may include encrypting the file using a given algorithm and/or key. Other sequestration rules may include storing the file or encrypted file in a safe backup storage location (i.e., a sequestration area) under certain access permissions. Access permissions to a sequestration area may be more restrictive than those to the file's original storage location.

SUMMARY

In various embodiments, a DLP system may be configured to protect sensitive data in conjunction with any content indexing (CI) metadata associated with the sensitive data. In some embodiments, a DLP system may be configured to detect a data loss risk and respond by discovering CI metadata associated with the data and sequestering the data and the CI metadata. The DLP system may identify a data loss risk to data at rest, for example, by performing a background content scan of one or more files. Instead or additionally, the DLP system may identify a data loss risk to data in motion, for example, by monitoring network traffic and performing content scans on files being transferred to intra or inter-network recipients.

According to various embodiments, in response to detecting a data loss risk, the DLP system may sequester the data and related CI metadata. Sequestering may include encrypting the data and/or moving or copying it to a backup storage location (i.e., a sequestration area), which may have more restrictive access permissions than the original storage location. In various embodiments, the data and metadata may be sequestered according to one or more common sequestration rules. For example, the data and metadata may be encrypted using the same encryption algorithm and/or encryption key. In another example, the data and metadata may be moved to the same sequestration area and/or the same access permissions may be applied to both the data and metadata.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

A Data Loss Prevention (DLP) system as described herein may allow an organization to identify, monitor, and protect sensitive data on its computer systems and network. For example, a DLP system may scan the contents of a given file during a background content scan and identify each file that contains sensitive information. If the DLP system determines that the data is sensitive (e.g., contains personal, proprietary, or other private information such as a credit card number), then a data loss risk may exist and the DLP system may therefore perform a pre-determined protective action, such as sequestering the file, according to various rules. Sequestering may include encrypting the file and moving or copying the encrypted file to a safe, backup location.

The DLP system may be configured to detect a data loss risk and respond by performing any number of actions, according to one or more rules. As used herein, the term data loss risk may refer to any situation wherein the DLP system determines a risk of exposing sensitive information to inappropriate parties. A data loss risk to data "at rest" may exist if sensitive data, such as files containing sensitive information, are stored in a manner that may potentially expose the data to inappropriate parties. For example, an unencrypted file containing social security numbers that is stored in directory with insufficient access restrictions may present a data loss risk to data at rest. A data loss risk to data "in motion" may exist if sensitive data is about to be transferred across or out of a network, where it may be exposed to an inappropriate party. As used herein, the term data loss risk may refer to risk to either data at rest or in motion.

A content indexing (CI) system as described herein may also perform content scans of data stored on a system or network of systems. For example, a CI system may perform a background scan of one or more file systems by scanning the contents of each file. After scanning the contents of any given file, the CI system may generate CI metadata describing the contents of the file and associate the metadata with the file. For example, the CI system may record the association in an indexing database. The indexing database may then be used to enable a user to perform quick searches of the file system content. In order to perform the search, a search engine may consult the indexing database rather than perform the relatively time consuming and computationally expensive task of scanning the content of multiple files in the file system.

Figure 1:
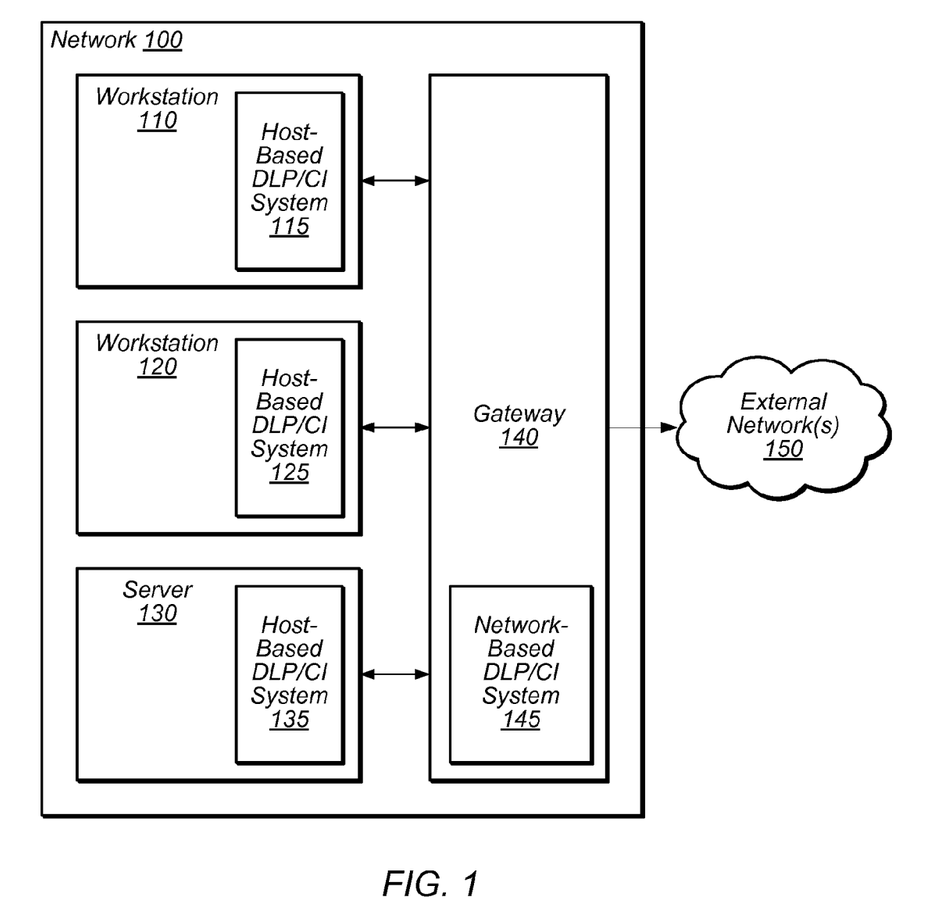
FIG. 1 is a block diagram illustrating a data loss prevention system.

FIG. 1 illustrates one embodiment of a network 100 including a workstation 110, a workstation 120, a server 130, and a gateway device 140. As shown, each workstation 110 and 120 as well as server 130 includes a respective host-based DLP/CI system. A host-based DLP/CI system may be embodied according to software instructions that execute on an end-user workstation or server and monitor network traffic incoming to or outgoing from the respective host. For example, in FIG. 1, DLP/CI system 115 includes software instructions that execute on workstation 110 and monitors its network traffic. DLP/CI systems 125 and 135 may include software instructions that execute on workstation 120 and server 130, respectively, and perform a similar monitoring function. In this context, server 130 and workstations 110 and 120 may be referred to as endpoint systems.

In FIG. 1, workstations 110 and 120, as well as server 130, reside within a common network 100. Using this network, the endpoints may communicate data to each other and to entities in external networks 150. For example, network 100 may be a local Ethernet network while external networks 150 may include a wide area network (e.g., internet) and other networks reachable via the wide area network. Data transmitted by the endpoint systems may be sensitive and its flow may therefore be monitored and controlled by the respective DLP system running on each endpoint system. Communications among the endpoint systems (110, 120, and 130) and from each endpoint system to entities on external networks 150 may include network file transfers, emails, instant messages, updates to databases, and/or any other data transfer.

Each host-based DLP/CI system 115, 125 and 135 may also monitor information transmitted via means other than a network. For example, if a user attempts to move sensitive information onto a removable drive, such as a flash drive, the DLP software may detect and disallow the transmission. In response to detecting that a given transmission is attempting to move sensitive data, the DLP software may disallow the transmission and/or sequester the data (e.g., by encrypting it and storing it in a safe location).

In addition to the host-based DLP/CI systems 115, 125 and 135, FIG. 1 also illustrates a network-based DLP/CI system 145 that functions to form a network DLP. A network DLP, sometimes referred to as a gateway-based DLP system, may include dedicated hardware and/or software, such as gateway 140, typically installed on the network for monitoring the flow of sensitive data across the network. For example, a network DLP may be installed on a gateway machine to monitor all ingress and egress traffic from a given network, such as network 100, to external networks, such as external networks 150. Thus, a network DLP may detect sensitive data leaks to outside sources. A network DLP may monitor network traffic across internal links of a network, such as internal emails and/or file transfers among the endpoint systems. A network DLP may inspect a data stream of network packets in order to determine which ones contain sensitive information. In such examples, a network DLP may need to identify sensitive information while observing multiple packet flows from various origins and to various destinations.

As will be described in further detail below, each DLP/CI system as illustrated in FIG. 1 may further be configured to coordinate the protection of a given file (or other data) along with CI metadata associated with that file. In various embodiments, a CI subsystem may provide an interface, such as an Application Programming Interface (API), to a DLP subsystem, by which the DLP subsystem may discover metadata associated with an at-risk file. In response to detecting that a given file presents a data loss risk, the DLP subsystem may sequester that file and its associated CI metadata. In some embodiments, the data and metadata may be sequestered according to one or more common sequestration rules. For example, the file and its CI metadata may be encrypted using the same encryption algorithm and/or encryption key.

It is noted that although FIG. 1 illustrates a system in which both host-based DLP functionality (i.e., as implemented by DLP/CI systems 115, 125 and 135 on respective host machines) as well as network-based DLP functionality (i.e., as implemented by DLP/CI system 145 on gateway 140) are employed, other systems are also possible. For example, in various embodiments, the functionality of a DLP/CI system as described herein may be provided solely within one or more host machines, or solely on a gateway device.

Figure 2:
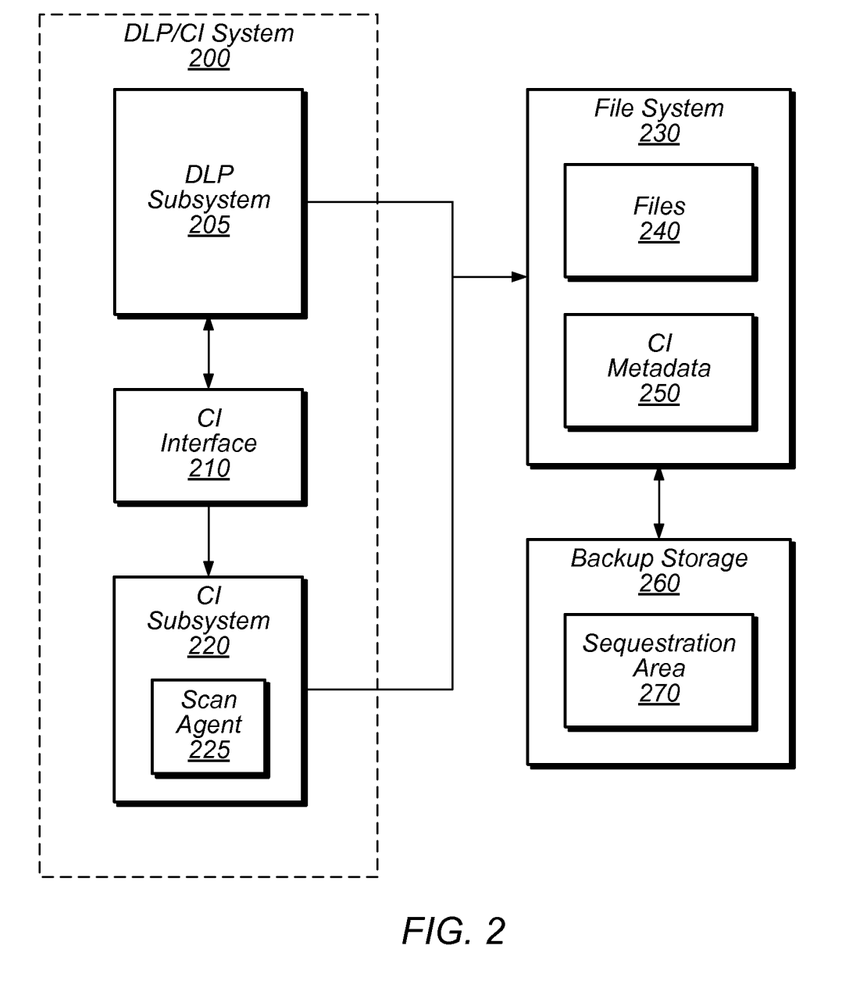
FIG. 2 is a block diagram illustrating a content indexing subsystem and data loss prevention subsystem configured to protect sensitive data and its respective CI metadata, according to some embodiments.

FIG. 2 is a block diagram illustrating a DLP/CI system 200 configured to discover and protect files containing sensitive information as well as CI metadata associated with those files, according to various embodiments. It is noted that DLP/CI system 200 is illustrative of any of the DLP/CI systems of FIG. 1. Thus, in FIG. 2, DLP subsystem 205 may be a host-based DLP, a network based DLP, or may include both types of components. According to the illustrated embodiment, DLP/CI system 200 may be connected to a file system 230 and protect various files and/or CI metadata files on that file system, such as files 240 and CI metadata 250 respectively. File system 230 may be implemented using any number of storage devices, any number of which may be local (e.g., one or more local disk drives, RAID storage, etc.) or distributed.

According to the embodiment of FIG. 2, CI subsystem 220 may be configured to index files 240 on file system 230, and generate respective CI metadata, such as 250, for those files. In various embodiments, the CI metadata may be stored as one or more files on the files system and/or on any number of other file systems accessible by CI subsystem 220 and DLP subsystem 205. In one embodiment, CI subsystem 220 may include a scan agent 225 configured to perform a content scan files on file system 230 at regular intervals (e.g., nightly), during which it may scan files 240 and generate/update respective CI metadata in 250.

File system 230 may span one or more physical drives and/or machines. CI metadata 250 may be stored in the form of a database, one or more files, or any other form searchable by the CI system and/or search engine. In order to execute a content search, CI subsystem 220 or a search engine may utilize CI metadata 250. In some embodiments, CI subsystem 220 may comprise a search engine. In various embodiments, CI metadata created based on the content of files 240 may be generated according to one or more rules sets by CI subsystem 220 (or a search engine), as desired.

DLP subsystem 205 may be configured to detect a data loss risk to sensitive data in motion by monitoring one or more network connections, as described above in conjunction with FIG. 1. In response to detecting an attempt to transmit data, DLP subsystem 205 may scan the contents of the data to determine if the data contains sensitive information. According to some embodiments, in response to detecting that a given file contains sensitive information, DLP subsystem 205 may prevent the transmission and/or sequester the file along with its associated CI metadata.

In response to detecting a data loss risk to a given file, DLP subsystem 205 may also be configured to discover CI metadata associated with the file and sequester the file along with its corresponding CI metadata according to one or more common sequestration rules. For example, sequestration of the file and corresponding CI metadata according to a common rule may include encrypting the file and CI metadata using the same encryption algorithm and/or the same encryption key. In some embodiments, sequestration according to a common rule may include copying or moving the file and metadata (and/or their encrypted versions) to a common backup location, such as to sequestration area 270 on backup storage 260 and/or creating an association between the data and metadata in the DLP backup system.

In various embodiments, backup storage 260 may comprise a sequestration area 270. Backup storage 260 may include a separate storage device from that or those that host file system 230. In some embodiments, file system 230 may include sequestration area 270. For example sequestration area 270 may comprise one or more directories in file system 230. In such embodiments, access permissions to one or more directories associated with sequestration area 270 may be set to restrict access. For example, sequestration area 270 may be fully accessible only to a given administrative user or users. In various embodiments, users other than the given administrative user(s) may have read-only permissions or no access permissions at all in sequestration area 270.

In some embodiments, any number of backup storage areas (e.g., 260) and sequestration areas (e.g., 270) may be used. In some examples, a single at-risk file may be moved to multiple sequestration areas. In others, various at-risk files may be moved to different sequestration areas, dependent on various DLP policies.

According to some embodiments, the CI subsystem 220 may provide an interface 210, such as a query interface and/or a programmatic application programming interface (API), by which DLP subsystem 205 may discover CI metadata associated with a given at-risk file. For example, DLP subsystem 205 may query CI system interface 210 using a unique identifier of a file that is at risk of a causing a data loss, such as the fully-qualified file system filename of the at-risk file. As used herein, the term fully-qualified filename may refer to a file system filename which includes directory information and/or any other data necessary for locating the file in the file system. According to such embodiments, in response to a query request, CI subsystem 220 may return information identifying the corresponding portion of CI metadata 250 to DLP subsystem 205. DLP subsystem 205 may then sequester the data and its corresponding CI metadata according to one or more common sequestration rules.

It is noted that in various embodiments, DLP subsystem 205 and CI subsystem 220 may be autonomous systems. In other embodiments, DLP subsystem 205 and CI subsystem 220 may be integrated as portions of a single software application. In various embodiments, DLP subsystem 205 may discover CI metadata for a given file by accessing CI subsystem 220 via query and/or API interface (e.g., through CI interface 210). Additionally or alternatively, DLP subsystem 205 and CI subsystem 220 may share access to common variables and/or data structures such that DLP subsystem 205 may determine CI metadata associated with a given file without a need to query or otherwise utilize CI interface 210.

Figure 3:
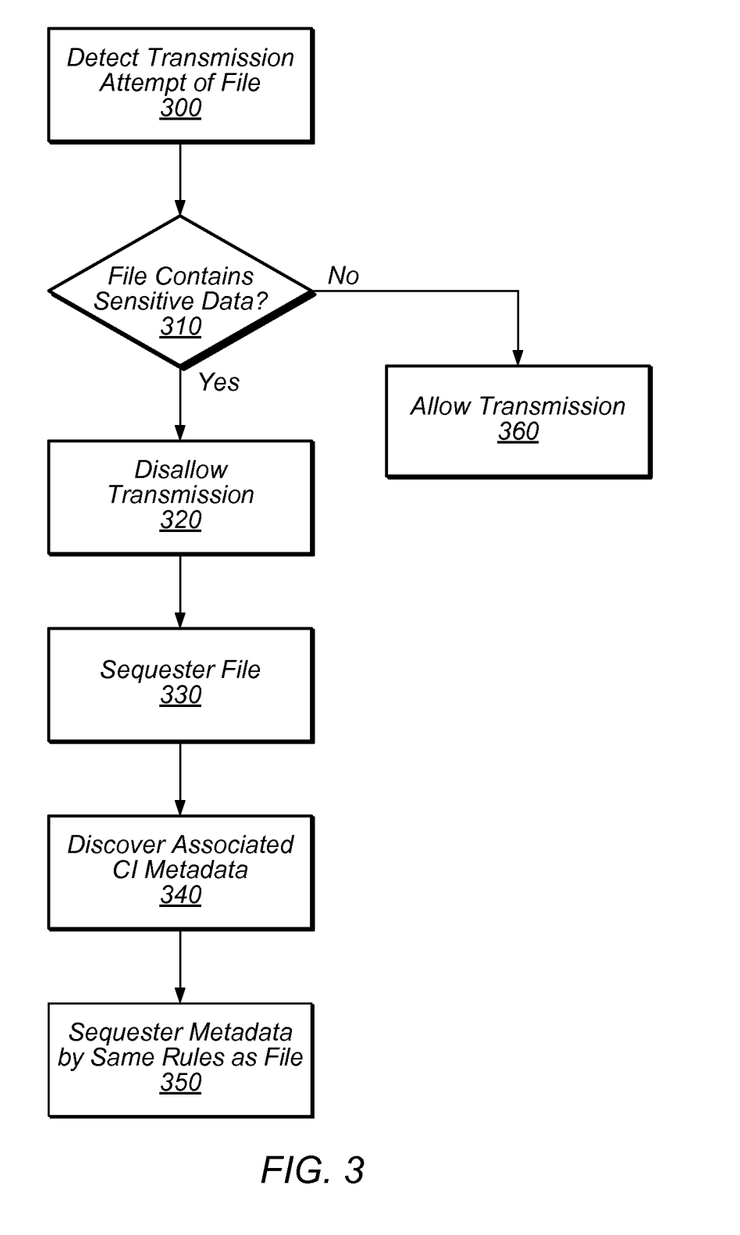
FIG. 3 is a flow diagram illustrating a method for a data loss prevention system protecting data in motion and its respective CI metadata, according to some embodiments.

FIG. 3 illustrates a method for identifying and sequestering sensitive data in motion along with associated metadata, according to one embodiment. As illustrated in FIG. 3, the method may begin by DLP subsystem 205 detecting a transmission attempt involving a given file, as in 300. In various examples, the transmission attempt may include a file attached to an email, a file transfer over an office network, a file transfer over an instant messaging program, or any other file transfers.

In response to detecting the transmission attempt, the DLP subsystem 205 may determine if the file contains sensitive information, as in 310. In some embodiments, this determination may include performing a content scan of the file. If the content scan reveals that the file contains no sensitive information, as indicated by the negative exit from 310, then the DLP subsystem 205 may conclude that no data loss risk exists and allow the transmission, as in 360. However, if the file is found to contain sensitive information, as indicated by the affirmative exit from 310, then the DLP subsystem 205 may determine that a data loss risk exists and disallow the transmission, as in 320. In some embodiments, DLP subsystem 205 may be configured to determine that a file contains sensitive information by accessing CI metadata created for the file during a previously conducted background scan performed by scan agent 224, as described in further detail below.

In addition to disallowing the transmission, the DLP subsystem 205 may further be configured to sequester the file, as in 330. As discussed above, sequestering the file may include copying or moving the data to one or more sequestration areas, which may have limited access rights. In some embodiments, the data may be encrypted. A strong encryption algorithm, (e.g., RSA, 3DES, AES, etc.), may be used to perform such encryption.

In conjunction with sequestering the sensitive file involved in the file transfer, in various embodiments, the DLP subsystem 205 may attempt to locate CI metadata associated with the file, as in 340, and sequester that metadata as well, as in 350. In some embodiments, the CI metadata for each file may be kept in one or more separate files. In such embodiments, the association between each file and the file(s) containing its respective CI metadata may be kept in one or more association databases or lookup table files.

In various embodiments, the DLP subsystem 205 may access the association databases or lookup table files directly for performing the CI metadata discovery of 340. In other embodiments, the CI subsystem 220 may maintain the association database and/or lookup table files and provide access to the DLP subsystem 205 via CI interface 210. In one such embodiment, the CI system interface may be query-based. For example, the DLP subsystem 205 may query the CI system using an identifier corresponding to the sensitive file (e.g., the fully-qualified file name of the sensitive file). The CI system may respond with one or more identifiers (e.g., fully-qualified file names) of the files containing the CI metadata corresponding to the sensitive file. In other embodiments, the CI interface may be an API.

In some embodiments, a single database or file may hold CI metadata relevant to multiple files. In such embodiments, the DLP subsystem 205 may identify and sequester only the parts of the database or file that hold CI metadata relevant to the sensitive, at-risk file. For example, in 340, the DLP subsystem 205 may identify that only a portion of a given file holds CI metadata relevant to the sensitive file. In response, the DLP subsystem 205 may sequester only the part of the file identified in 340, as part of sequestration operations of 350.

In some embodiments, the DLP subsystem 205 may apply one or more common sequestration rules to both the file and its CI metadata. For example, in one embodiment, if the DLP subsystem 205 determines that the sequestration of a given sensitive file (e.g., 330) should include encrypting it, then it may apply this same rule to the sequestration of the file's CI metadata by also encrypting the CI metadata. In further embodiments, the DLP subsystem 205 may use the same encryption algorithm and/or encryption key for encrypting the sensitive file and its CI metadata.

In another example, the DLP subsystem 205 may apply a rule that sequestering the sensitive file, as in 330, should comprise moving it to a backup location (e.g., sequestration area 270 in backup storage 260) and restricting access to the file so that users, such as the one that initiated the transmission attempt of 300, cannot readily access it. In such an embodiment, the DLP subsystem 205 may apply the same rule to the CI metadata associated with the file. Thus, sequestering the file's associated CI metadata, as in 350, may include moving the metadata to the same sequestration area, or directory of the sequestration area, as the one to which the sensitive file was moved. Many further examples are possible, such as applying the identical replication policies, sequestration time limit policies, etc.

Figure 4:
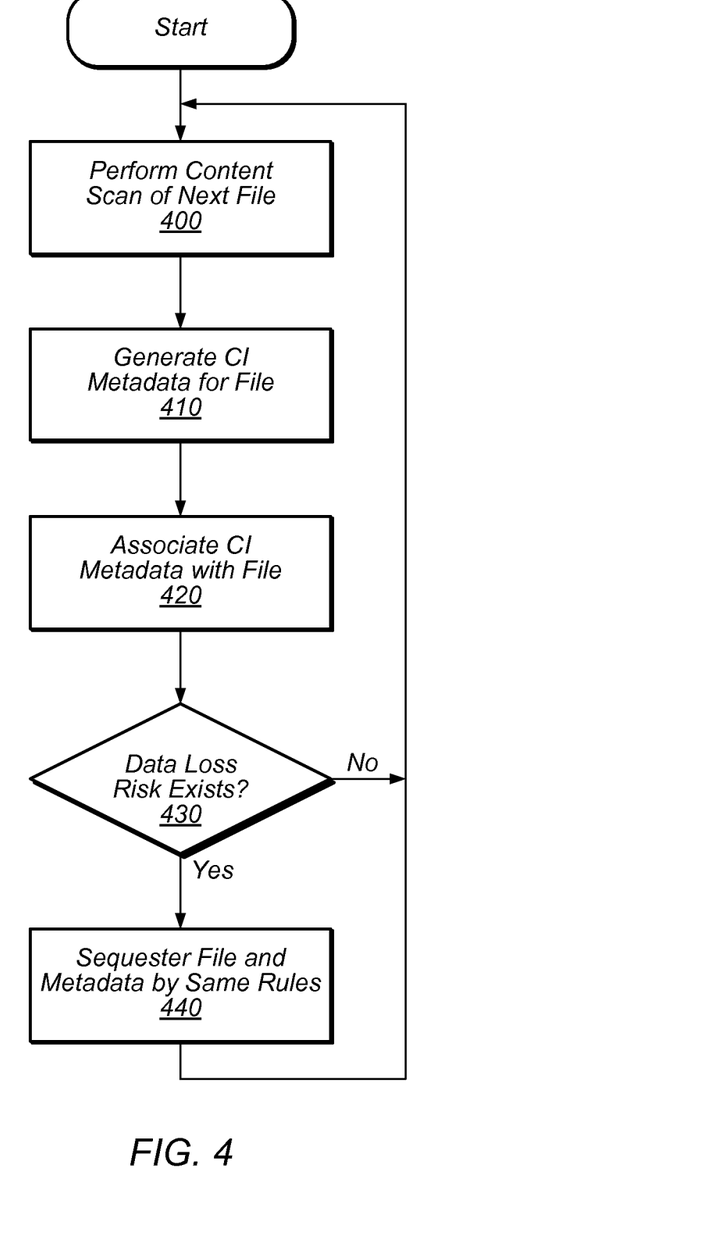
FIG. 4 is a flow diagram illustrating a method for performing a background content scan for protecting files in a file system and their respective CI metadata, according to some embodiments.

FIG. 4 illustrates a method for performing a background scan, according to some embodiments. The method may be performed by scan agent 225 and, in various embodiments, may be performed on a pre-scheduled basis and/or other recurring basis to scan a file system's contents.

According to various embodiments, scan agent 225 may be configured to perform a scan of contents of files according to rules dictated both by CI subsystem 220 to thereby generate CI metadata to facilitate CI index searching, as well as rules dictated by DLP subsystem 205 (e.g., and provided through CI interface 210) to thereby generate metadata usable by DLP subsystem 205 to determine that a file is sensitive upon an attempt to transmit the data, as discussed above. For example, upon detection of an attempt to transmit a particular file, DLP subsystem 205 may be configured to access the CI metadata to determine the file contains sensitive information. Scan agent 225 may alternatively or additionally be configured to sequester sensitive data and respective metadata during a background scan based, for example, on rules provided by DPL subsystem 205.

Accordingly, the method of FIG. 4 begins when scan agent 225 scans a given file, as in 400. The scan agent 225 may then generate CI metadata for the scanned file, as in 410. In some embodiments, if CI metadata already exists for the scanned file, the scan agent 225 may update that metadata depending on the content scan. As discussed above, the CI metadata may be stored in one or more files, which may each store CI metadata pertaining to one or more other files in the system. For example, a central database file may store CI metadata for all files in a file system.

According to the illustrated embodiment, the scan agent 225 may then associate the generated or modified CI metadata with the scanned file, as in 420. In various embodiments, this association may be recorded in a database or one or more lookup files or data structures. This database may be the same as the one holding the CI metadata itself.

Once the file is associated with the most up-to-date CI metadata, the scan agent 225 may also be configured to determine whether a data loss risk exists, as in 430. If a data loss risk exists (e.g., the file contains a given header that is indicative of sensitive information and the file not protected with sufficient access controls), the scan agent 225 may be configured to sequester the file and its respective metadata, as in 440. As in 350, the sequestration of the file and metadata in 440 may proceed according to one or more common sequestration rules as set by DLP subsystem 205.

Once the file and metadata are sequestered (as in 440) or the scan agent 225 determines that no data loss risk exists (as indicated by the negative exit from 430), the content scan may continue by examining the next file in the file system, as indicated by the feedback loop to 400. The method of FIG. 4 may be used to scan and protect files and associated metadata at rest in a file system. For example, the method may be executed on a regular schedule as a background scan of the contents of a given file system.

Figure 5:
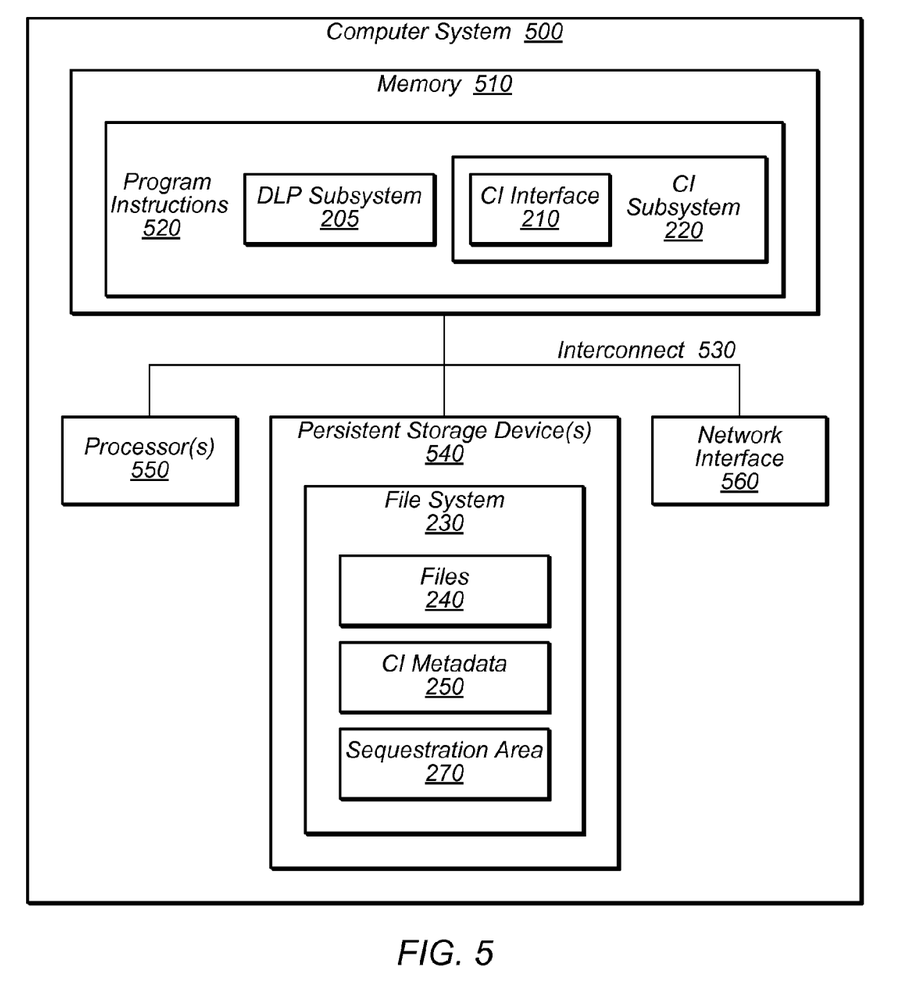
FIG. 5 is a block diagram of a computer system configured to implement a DLP/CI system capable of protecting files in a file system and their respective CI metadata, according to some embodiments.

FIG. 5 illustrates a computer system configured to implement a DLP/CI system for protecting sensitive data and its associated metadata, according to various embodiments. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. It is noted that features that correspond to those of FIG. 2 are numbered identically for simplicity and clarity.

Computer system 500 may include one or more processors 550, each of which may include multiple cores, any of which may be single or multi-threaded. The computer system 500 may also include one or more persistent storage devices 540 (e.g. optical storage, magnetic storage, hard drive, tape drive, solid state memory, etc), which may store data implementing one or more file systems 230. File systems 230 may store sensitive data, such as files 240 and CI metadata 250 for indexing files 240. In some embodiments, file system 230 may contain one or more sequestration areas 270 for storing sequestered data as described herein.

Computer system 500 may include one or more memories 510 (e.g., one or more of cache, SRAM, DRAM, RDRAM, EDO RAM, DDR 10 RAM, SDRAM, Rambus RAM, EEPROM, etc.). Computer system 500 may include one or more network interfaces 560 for transmitting and receiving data, which may be monitored for sensitive data using a DLP system, as described herein. Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.)

The one or more processors 550, storage device(s) 540, network interface 560 and system memories 510 may be coupled to system interconnect 530. One or more of the system memories 510 may contain program instructions 520. Program instructions 520 may be encoded in platform native binary, any interpreted language such as Java™ byte-code, or in any other language such as C/C++, Java™, etc or in any combination thereof. Program instructions 520 may include program instructions executable by processors 550 that implement the DLP subsystem 205 with the capability to protect files and associated CI metadata, as described herein. Program instructions 520 may also be executable to implement CI subsystem 220 for performing content indexing of files 240 in file system 540. CI system 220 may include a discovery interface, such as CI interface 210, that may allow DLP subsystem 205 to discover metadata associated with a given file or a file associated with given metadata.

The DLP/CI system as described herein for protecting files and their associated metadata may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A non-transitory computer-readable storage medium, storing program instructions to implement:
   content indexing software, wherein the context indexing software is executable by a computer system to index a plurality of files, wherein for each respective file of the plurality of files, said indexing includes determining contents of the respective file and creating corresponding content indexing (CI) metadata for the respective file which describes the contents of the respective file and enables search operations to be performed on the respective file without accessing the contents of the respective file; and
   data loss prevention software, wherein the data loss prevention software is executable by the computer system to:
      monitor the plurality of files for data loss prevention, wherein said monitoring includes detecting that a particular file of the plurality of files presents a data loss risk;
      in response to said detecting that the particular file presents the data loss risk:
         query the content indexing software to discover the corresponding CI metadata for the particular file; and
         sequester the particular file and the corresponding CI metadata for the particular file, wherein in performing said sequestering the data loss prevention software is executable by the computer system to apply a common sequestration rule to both the particular file and to the corresponding CI metadata for the particular file.

2. The computer-readable storage medium of claim 1, wherein the data loss prevention software is executable by the computer system to perform said detecting that the particular file presents the data loss risk as part of a background scan.

3. The computer-readable storage medium of claim 1, wherein the data loss prevention software is executable by the computer system to perform said detecting that the particular file presents the data loss risk in response to an attempt to transmit the particular file.

4. The computer-readable storage medium of claim 1, wherein in performing said sequestering, the data loss prevention software is executable by the computer system to encrypt both the particular file and the corresponding CI metadata for the particular file.

5. The computer-readable storage medium of claim 1, wherein in performing said sequestering, the data loss prevention software is executable by the computer system to move the particular file and the corresponding CI metadata for the particular file to a sequestration storage area.

6. A method comprising:
   executing content indexing software on a computer system to index a plurality of files, wherein for each respective file of the plurality of files, said indexing includes determining contents of the respective file and creating corresponding content indexing (CI) metadata for the respective file which describes the contents of the respective file and enables search operations to be performed on the respective file without accessing the contents of the respective file; and
   executing data loss prevention software on the computer system, wherein the data loss prevention software executes to:
      monitor the plurality of files for data loss prevention, wherein said monitoring includes detecting that a particular file of the plurality of files presents a data loss risk;
      in response to said detecting that the particular file presents the data loss risk:
         query the content indexing software to discover the corresponding CI metadata for the particular file; and
         sequester the particular file and the corresponding CI metadata for the particular file, wherein said sequestering comprises applying a common sequestration rule both to the particular file and to the corresponding CI metadata for the particular file.

7. The method of claim 6, wherein the data loss prevention software performs said detecting that the particular file presents the data loss risk as part of a background scan.

8. The method of claim 6, wherein the data loss prevention software detects that the particular file presents the data loss risk in response to an attempt to transmit the particular file.

9. The method of claim 6, wherein said sequestering comprises encrypting the particular file and the corresponding CI metadata for the particular file.

10. The method of claim 6, wherein said sequestering comprises moving the particular file and the corresponding CI metadata for the particular file to a sequestration area.

11. A computer system comprising:
one or more processors; and
memory storing content indexing software and data loss prevention software;
wherein the context indexing software is executable by the one or more processors to index a plurality of files, wherein for each respective file of the plurality of files, said indexing includes determining contents of the respective file and creating corresponding content indexing (CI) metadata for the respective file which describes the contents of the respective file and enables search operations to be performed on the respective file without accessing the contents of the respective file; and
wherein the data loss prevention software is executable by the one or more processors to:
monitor the plurality of files for data loss prevention, wherein said monitoring includes detecting that a particular file of the plurality of files presents a data loss risk;
in response to said detecting that the particular file presents the data loss risk:
query the content indexing software to discover the corresponding CI metadata for the particular file; and
sequester the particular file and the corresponding CI metadata for the particular file, wherein in performing said sequestering, the data loss prevention software is executable by the one or more processors to apply a common sequestration rule both to the particular file and to the corresponding CI metadata for the particular file.

12. The computer system of claim 11, wherein the data loss prevention software is executable by the one or more processors to perform said detecting that the particular file presents the data loss risk as part of a background scan.

13. The computer system of claim 11, wherein the data loss prevention software is executable by the one or more processors to perform said detecting that the particular file presents the data loss risk in response to an attempt to transmit the particular file.

14. The computer system of claim 11, wherein in performing said sequestering, the data loss prevention software is executable by the one or more processors to encrypt both the particular file and the corresponding CI metadata for the particular file.

\* \* \* \* \*